United States Patent [19]
Arledge et al.

[11] Patent Number: 5,561,703
[45] Date of Patent: Oct. 1, 1996

[54] SYSTEM AND METHOD FOR INTEGRATION OF A PAGING SERVER INTO A PRIVATE BRANCH EXCHANGE ENVIRONMENT

[75] Inventors: Cathy L. Arledge; Tracy R. Jackson, both of Austin, Tex.

[73] Assignee: Rolm Company, Santa Clara, Calif.

[21] Appl. No.: 271,323

[22] Filed: Jul. 6, 1994

[51] Int. Cl.⁶ ........................................................ H04Q 7/06
[52] U.S. Cl. .................................................. 379/57; 379/58
[58] Field of Search ................................ 379/57, 58, 59, 379/61, 63, 142, 88, 89, 201, 67, 97, 196, 211, 212, 210, 100; 340/825.44

[56] References Cited

U.S. PATENT DOCUMENTS

| | | | |
|---|---|---|---|
| 4,642,425 | 2/1987 | Guinn, Jr. et al. | 379/57 |
| 4,680,785 | 7/1987 | Akiyama et al. | 379/57 |
| 4,866,758 | 9/1989 | Heinzelmann . | |
| 4,896,319 | 1/1990 | Lidinsky et al. . | |
| 5,090,051 | 2/1992 | Muppidi et al. | 379/61 |
| 5,113,430 | 5/1992 | Richardson, Jr. et al. . | |
| 5,127,003 | 6/1992 | Doll, Jr. et al. . | |
| 5,175,758 | 12/1992 | Levanto et al. | 379/57 |
| 5,177,780 | 1/1993 | Kasper et al. | 379/59 |
| 5,329,578 | 7/1994 | Brennan et al. | 379/67 |
| 5,375,162 | 12/1994 | Kim et al. | 379/57 |
| 5,384,835 | 1/1995 | Wheeler et al. | 379/96 |

*Primary Examiner*—Curtis Kuntz
*Assistant Examiner*—Michael B. Chernoff

[57] ABSTRACT

A communication system and method of use which integrates a paging system into the PBX communication environment providing enhance performance and capabilities. A PBX environment brings together many forms of communication: telephony conversations, voice mail, electronic mail, Fax messages, and others. The paging system, which consists of a paging server, a voice response unit, and end user paging devices, is integrated into the PBX environment making it the focal point of communications. The paging devices provide immediate and visual indication to the user of a request for callback and relative urgency for the callback, and of the arrival of other forms of communication such as a voice mail message, electronic mail, and Fax. The paging system subscriber need only look at his paging device to determine if E-Mail, Voice Mail, or facsimile messages await. Performance is also enhanced for a caller trying to reach a paging system subscriber. Callers only need to dial a single phone number, rather than a phone number for the office and a different phone number to page. Because the paging system utilizes a voice response unit, callers are informed of their options and instructed how to complete their communication.

18 Claims, 3 Drawing Sheets

SYSTEM AND METHOD FOR INTEGRATION OF A PAGING SERVER INTO A PRIVATE BRANCH EXCHANGE ENVIRONMENT

FIELD OF THE INVENTION

This invention relates to a communication system and method for providing messages and notifications to a user via a paging server. More specifically, this invention relates to a communication system, and method for using same, which incorporates a private branch exchange and a paging server integrated therewith for permitting a user to be notified upon receipt of incoming facsimiles, E-mail messages, and/or phone-mail messages.

BACKGROUND OF THE INVENTION

A private branch exchange (PBX) environment brings together many forms of communication including but not limited to: telephony conversations, voice or phone mail, electronic mail (E-Mail), and facsimile messages. However, presently, to retrieve voice mail messages and other forms of PBX communications, you have to access the system to determine if any messages have been received. For many users, this is deficient because messages, which can be urgent, may be received much earlier than they are retrieved. Further, since communication options are segregated, the user must separately check pagers, dial into and check the voice mail system, log on to E-Mail, and check the FAX server to determine whether the message has been received.

Individually, paging systems and PBX environments suffer many disadvantages. For example, many pagers suffer the ability to discriminate between urgent and non-urgent calls. To indicate the urgency of a page today, many people utilize an agreed upon prearranged code. Illustrating this scenario, a page sender and a page receiver may agree that three digits after the telephone number to be entered during a page will be used for a prearranged code. In one example of a prearranged code, "111" could be used to represent a business emergency, "222" could be used to represent a business non-emergency, "333" could be used to represent a personal emergency, and "444" could be used to represent a personal non-emergency. Therefore, in the event of a business emergency, the page sender would know to page the page receiver and enter "111" after her phone number to indicate that there was a business emergency. The "111" would be displayed on the pager LCD and the page receiver would compare this code with his list and determine that this is a business emergency. This method is deficient because it requires that the code be prearranged and either written down or memorized.

One way pagers, i.e., pagers without a display, assume one origination and you must call to obtain the urgency of the message. With these pagers, a tone or vibration occurs when there is a message, however, without calling you have no idea of the urgency of the message. This is unsatisfactory for many users who do not wish to remove themselves from an important situation, e.g., a business meeting, to call the page sender only to find out that the message was unimportant.

Additionally, page systems do not identify the person you are trying to page. Therefore, a page sender may not target the correct recipient of a page due to dialing a wrong pager telephone number or to a pager number change. Further, the page sander would be unaware that the intended page receiver never received the page. This is deficient for many page system users, especially users who frequently transmit and receive urgent messages.

Many pagers are restricted to a local zone. This makes the pagers ineffective when the page receiver is out of town. While paging systems are available that expand the paging zone, they are very expensive and they are not integrated into a PBX environment.

PBXs are used as in-house telephone switching systems that electronically or optically interconnect one telephone extension to another, as well as to the outside telephone network. Further, PBXs are known to perform various telephone management functions, such as least cost routing for outside calls, call forwarding, conference calling, call accounting, as well as integrating voice mail systems, E-Mail systems, and facsimile machines. However, heretofore, PBX environments have had disadvantages associated therewith. For example, a sender of an E-Mail message, a voice mail message or a facsimile has no way of knowing if and when the intended receiver will be notified of the incoming message of facsimile if the recipient is not located at or near his computer, telephone, or facsimile machine. This is deficient for many users who work in an environment where urgent E-Mail, voice mail, and facsimile messages are transmitted and received.

Illustrating the above deficiency, a user transmits an E-Mail or voice mail message to a group of ten scheduled attendants to inform them that the important meeting scheduled for 3:00 has been changed to 2:00. However, if the scheduled attendants are away from their computers or telephones, it is possible that they will not be notified of the received message in time. Therefore, they could arrive late or miss the meeting. Thus, present PBX system are incomplete for many users, especially users in corporate settings.

Therefore, it is desirable to merge a paging system and all forms of office and message communications into one system which can be customized, and selectively notify or display the message to the user, regardless of his location.

SUMMARY OF THE INVENTION

The present invention solves the problems described above by providing a method and apparatus for integrating a paging system into a PBX system to provide capabilities for users which are non-existent in either segregated system.

It is an object of the invention to provide a way of merging all forms of office communication, including Fax Mail, voice mail, and E-Mail, by displaying the receipt of a message on a unique pager device.

It is an object of the present invention to eliminate the need for users to check for messages from multiple sources of communication.

It is an additional object of the invention to provide a way of merging all forms of office communication to be displayed on a unique pager device.

It is a further object of the invention to provide the user with a digital pager device that displays indication of all forms of messages, and allows him to customize his personal paging application. Additionally, the invention allows the user to customize the offering, allowing him flexibility to handle his messages in the manner he prefers.

It is yet another object of the present invention to provide a paging system with immediate and visual indication to the user of a request for callback and relative urgency for the callback, and of the arrival of other forms of communication such as a voice mail message, electronic mail, and facsimile.

The paging system subscriber need only look at his paging device to determine if messages await.

It is an object of the present invention to enhance system performance for a person trying to reach a paging system subscriber. According to the invention, the message sender call a single phone number, rather than a number for the office and a different number to page. A voice response unit informs the message senders of their options and instructs them how to complete their communication.

It is a further object of the invention to provide callers with the option to identify the "urgency" or "personal" nature of the call.

It is yet another object to expand the paging area for the user.

Other objects of the invention will become apparent from the drawings and detailed description below.

DETAILED DESCRIPTION

This invention relates to a communication system and method for providing messages and notifications to a user via a paging server. More specifically, this invention relates to a communication system, and method for using same, which incorporates a private branch exchange and a paging server integrated therewith permitting a user to be notified upon receipt of incoming facsimiles, E-mail messages, and/ or phone-mail messages.

Figure 1:
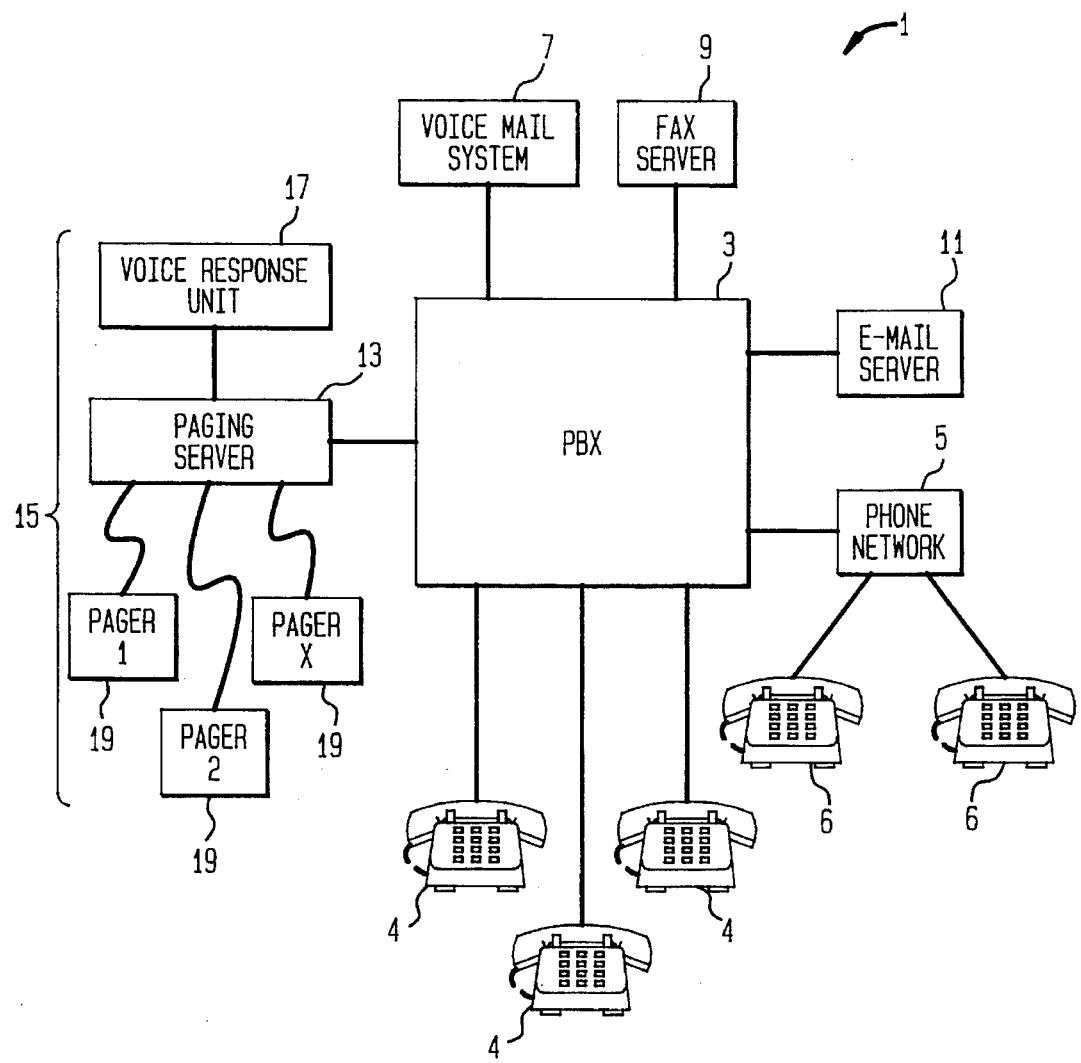
FIG. 1 is a block diagram illustrating a paging server integrated into a PBX environment of the present invention.

As illustrated in FIG. 1, the communication system of the present invention is designated by reference numeral 1. Communication system 1 is a private branch exchange (PBX) environment which includes a PBX 3, internal telephony devices 4, and application servers. PBX 3 is also connected to an external phone network 5 to permit communication between external telephony devices 6 and internal telephony devices 4 and between external telephony devices 6 and the application servers.

The application servers depicted in FIG. 1 include PhoneMail or other voice mail :systems 7, a FAX server 9, an E-Mail server 11 which is typically controlled by a host computer, not shown, and a paging server 13. Other application servers may be used in addition to, or in lieu of, the application servers shown in FIG. 1. The operation of telephony devices 4 and 6 and the application servers 7, 9, 11, and 13, and the capability to provide the necessary structure to interface with PBX 3 is well known to one skilled in the art. An application server should be construed as an application designed to run in a server. Further, while the application servers 7, 9, 11, and. 13 are schematically illustrated in FIG. 1 as distinct, it is well recognized to one skilled in the art that one or more application servers 7, 9, 11, and 13 may be incorporated within a common machine or device.

Application servers 7, 9, 11, and 13 are messaging servers. As is well known to those in the art, messaging server functions include storing and allowing access to messages, including voice mail, facsimile, and electronic mail messages.

Paging server 13 is part of a paging system 15 which also includes a voice response unit 17 and at least one end user paging device 19, e.g., a pager. Paging system 15 is integrated with PBX 3 to provide enhanced communication capabilities in PBX environment 1. These enhanced capabilities are described in detail hereinafter.

Figure 2:
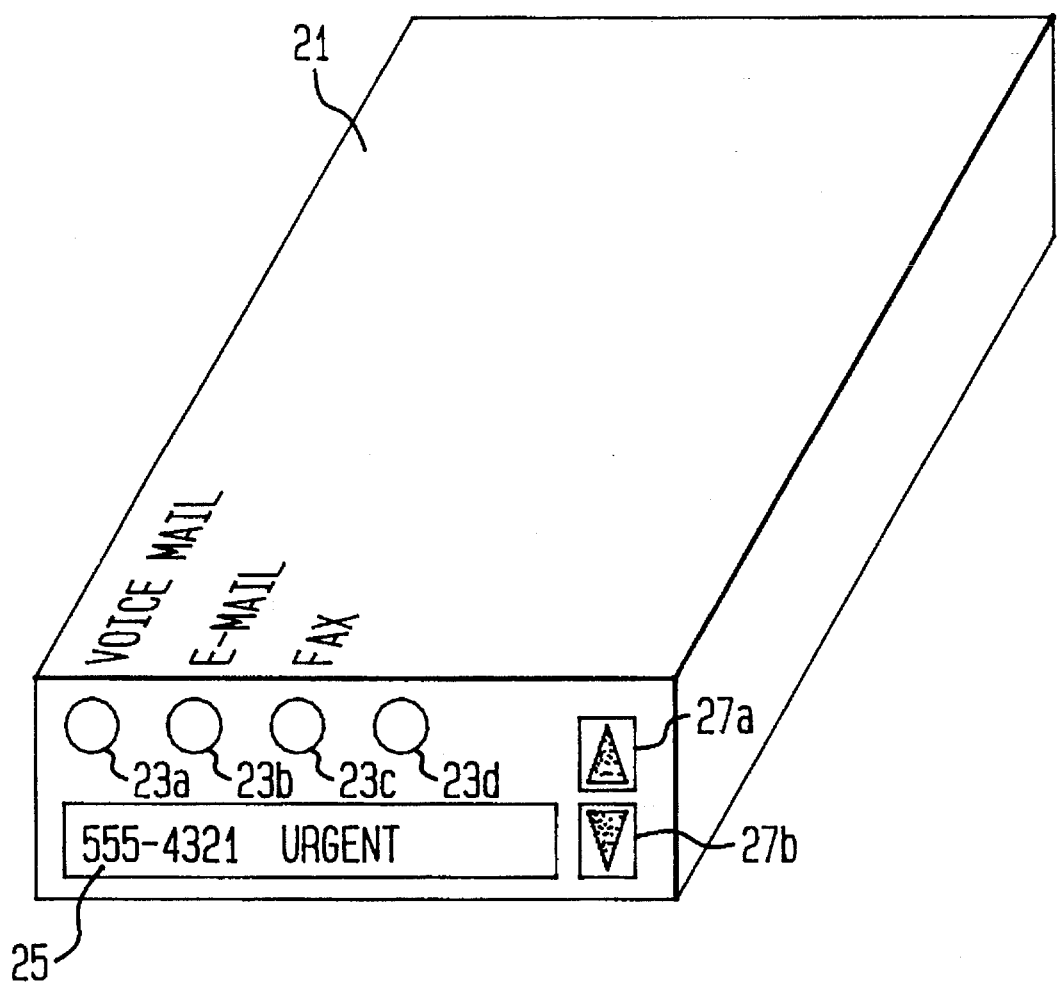
FIG. 2 is an isometric view of an end user paging device.

FIG. 2 also shows the preferred embodiment of pager 19. Pager 19 includes a chassis 21, a plurality of LEDs 23, an LCD 25 and scroll keys 27. The LEDs 23a, 23b, 23c, and 23d can be used to indicate messages are available at particular application servers. For example, LED 23a may be used to indicate the arrival of a voice mail message on Phone Mail system 7. LEDs 23b and 23c may be used respectively to indicate the arrival of messages on E-Mail server 11 or FAX server 9. Additional LEDs 23d may be used for additional applications or future options.

LCD 25 is preferably used for providing the user with a display of pages and associated information, e.g., phone numbers to call, their relative urgency identification, and other desired information. However, as described hereinafter, LCD 25 may be used to display information relating to the sender or subject matter of an E-Mail message or information relating to the sender of a facsimile message. Scroll keys 27a and 27b are associated with the LCD to allow the user to scroll through additional pages or notifications.

Figure 3:
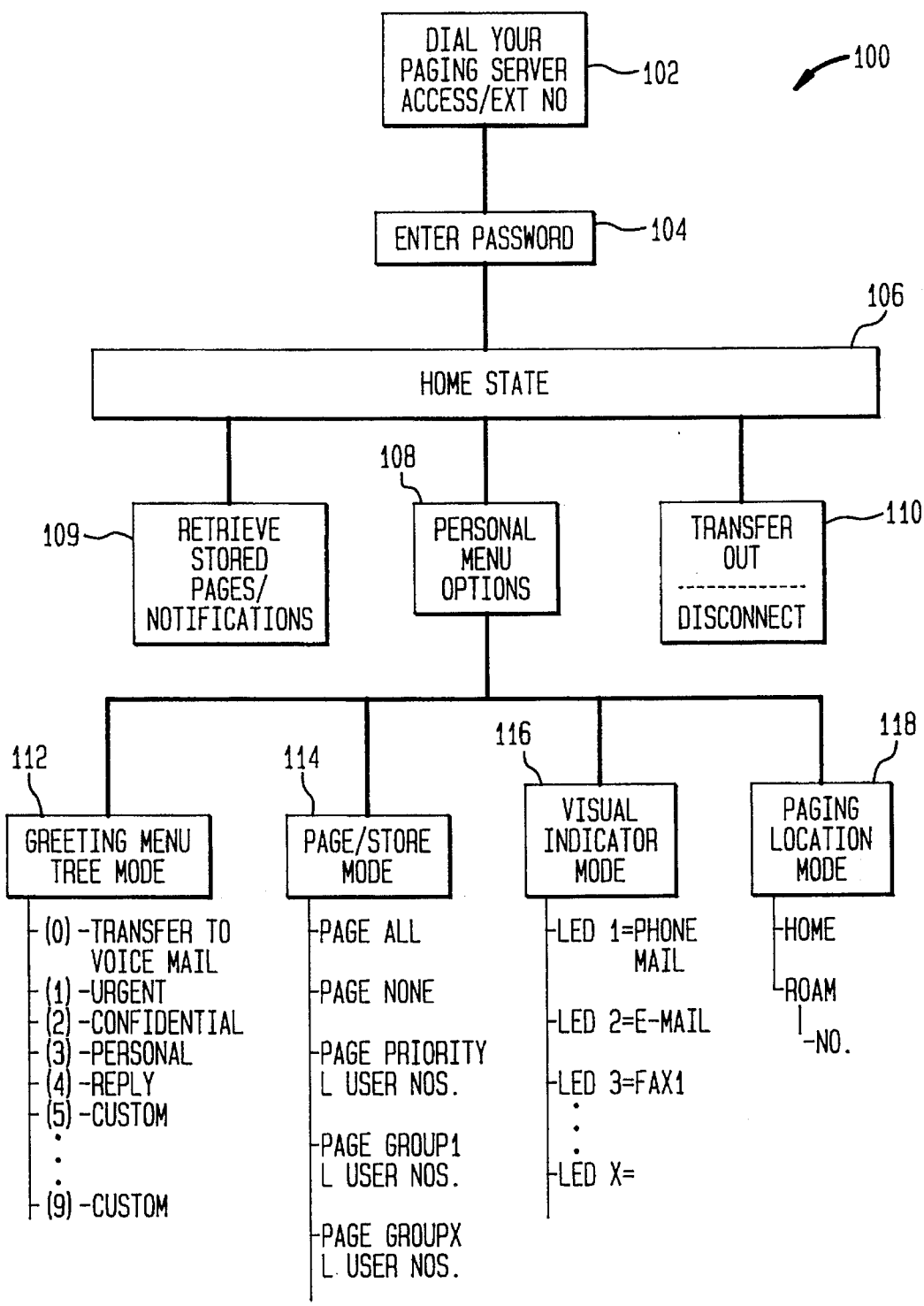
FIG. 3 depicts a paging server decision tree for use with the PBX integrated paging server.

Paging server 13 is programmable permitting it to be customized by each user for his preferred settings for a greeting menu tree, an answering mode, visual indicators, and paging location. One example of a customizable paging server decision tree is shown in FIG. 3 and designated by reference numeral 100. A user, upon dialing his paging server access or extension number 102 and entering his password 104 on a telephone, will gain access to paging server decision tree 100 and be in home state location 106. From home state location 106, the user may define or redefine his personal menu options 108, retrieve stored pages 109, or disconnect from the decision tree 100 at 110.

Personal menu options can be defined and redefined in greeting menu tree mode 112, page/store mode 114, visual indicator mode 116, and paging location mode 118. The settings in these modes 112, 114, 116 and 118 are all preferably easily changeable by the user in order to enable the user to quickly and easily change the settings for his immediate requirements.

Voice response unit 17 works in conjunction with the settings for greeting tree menu mode 112 enabling the paging server 13 to play an audible greeting to a caller, receive an input selection from the caller, and carry out the function selected by the caller. Voice response unit 17 provides the audible greeting and list of options for callers who call the user's paging number directly or who call the user's telephone number or exchange when the user has his calls forwarded from his telephone number to his pager number. This allows the callers of both his telephone number and his pager number with the option to page him or to transfer out of paging server 13 to Voice Mail system 7 and leave a message.

The audible greeting preferably includes a greeting segment and list of operating functions to be selected by a caller. A greeting segment may comprise a brief message stating the user's name, the user's company, and any other message her would like to convey to his callers. A caller hearing the user's greeting would be assured that she dialed the user's correct pager number or extension.

The list of operating functions describes a list of options to the callers and ask them to press a respective number on their telephones to perform that function. For example, the announcement to the caller following the initial greeting may be, "To leave a PhoneMail message, please press zero to be transferred to the PhoneMail system. To page me, please select from the following menu . . . ". Likely option announcements for notifying the caller of paging options could be, "Press one if this page is urgent. Press two if it is confidential. Press three if this page is personal, and four if this page is a reply to an earlier message I left you". Options five through nine are customizable by each user as described below. After the caller has selected from the menu he is prompted to enter the number that he can be reached at for the page.

In operation, a caller who has a personal message for the user would press "3" on his telephone and enter a telephone number where he could be reached. Upon the caller completing this task, paging server 13 would transmit a signal to user's pager 19. LCD 25 of the user's pager 19, would indicate the caller's entered phone number and the nature of the call. In this situation the indication for the nature of the call may be "PERSONAL" "PERS" or any other desired display which the user would recognize to associate that the page is personal in nature.

A user may customize options (5)–(9) for his specific needs to maximize communication system 1 for his requirements. For example, message options (5)–(9) may be associated with specific work projects, specific callers, groups of callers, or any other category the user desires. One example would be to define message option (6) for messages relating to "Project A" and define message option (7) for messages relating to "Project B". A caller working on Project B with the user would then select option (7) after hearing the respective audible prompt and type in her phone number so that the user can return her call. Paging server 13 would then send a signal to the: user's pager 19 and which would display the co-worker's entered phone number and a short message, e.g., "PROJ B" indicating that the page is regarding Project B The user could then determine the relative importance of when to call the co-worker back. Thus, if Project B was urgent, the user could call the co-worker immediately. However, if Project A was urgent and Project B was not, the user could call the co-worker back at her convenience.

This customizable feature has been described in an embodiment which provides the caller with a single digit input prompt, i.e., ten choices. However, it should be recognized that an input prompt could be provided that includes more than one digit.

The capabilities provides by mode 112 are apparent from the following scenario. A user is attending a seminar. While the seminar is relatively important to her, returning calls (i) from her manager, (ii) about Project X and (iii) which the caller deems as "URGENT" is more important than the seminar. The user has previously customized option (5) for her manager and option (6) for Project X. At the appropriate point in the audible list of operating functions by voice response unit 17, a caller would hear, "Press five if this page is from Ms. Smith. Press six if this page is relating to Project X." Options (5) and (6) could also be appropriately customized to display "MGR" or "PROJ X" on LCD 25. Thus, if the user receives a page in the seminar, she knows that she can return most pages at the next convenient break, but if the message on LCD 25 after the page number is "URGENT", "MGR" or "PROJ X" she should return the call on an expedited level This permits the user to more efficiently use her time, and in turn, provides the user with a system to maximize her working efficiency.

The settings in page/store mode 114 permit the user to decide if she wants to receive pages immediately or store pages and retrieve the pages at her convenience. If page/store mode 114 is set to "PAGE ALL", all pages will be sent to the user's pager 19 upon receipt of the page by the caller. If page/store mode 114 is set to "PAGE NONE", the pages will be sent to a memory location, preferably within paging server 13, and can be retrieved by the user at a later date by entering retrieve stored messages 109 from home state location 106.

In addition to page/store mode 114 settings of "PAGE ALL" and "PAGE NONE", page/store mode 114 can be set to send some pages and store the others. One method to accomplish this is to set page/store mode 114 to "PAGE PRIORITY" or "PAGE GROUP". A "PAGE GROUP" or "PAGE PRIORITY" setting will transmit pages which originated from a preselected group of internal phone extensions and/or from external phone numbers. The user can define or modify a list of extensions and external phone numbers of a "PAGE GROUP" or "PAGE PRIORITY" setting. Caller ID software is known in the art to detect the origin of phone numbers from the outside telephone network. It is recognized that while the invention is described as including one page group setting, additional group settings, e.g., PAGE GROUP 1, PAGE GROUP 2, PAGE GROUP 3, etc., could be used in any combination. For example, page/store mode 114 can be set to send pages from callers in the groups of: "PAGE PRIORITY", "PAGE GROUP 1" or "PAGE GROUP 3". In such an arrangement, pages from callers who are in "PAGE GROUP 2" would be stored.

It is also within the scope of the invention to include a "VIP GROUP" which is modifiable only by a system operator. For example, the "VIP GROUP" could be set to always send pages to the user by the company president and vice president. Thus, a user who sets page/store mode 114 to send pages from "PAGE GROUP 1" only, would receive pages on pager 19 which originated from callers in group 1, from the company's president, or from the company's vice president.

Further, a notify/store mode, not shown, could be used for E-Mail and facsimile notifications in a manner similar to page/store mode 114. For example, the user could choose between "E-MAIL NOTIFY ALL", "E-MAIL NONE", "E-MAIL NOTIFY PRIORITY" and "E-MAIL NOTIFY GROUP" in a manner similar to the page settings. Thus, if page/store mode 114 for E-mail notifications is set up for "E-MAIL NOTIFY PRIORITY" the user will receive notification of the E-Mail receipt if the E-Mail sender has an address which is on the user's programmed priority list. Notification of other E-Mail messages would be stored and later retrieved from retrieve stored messages 109. These capabilities are possible because E-Mail server 11 and facsimile server 9 can "tag" the notification signal to paging server 13 enabling paging server 13 to identify the sender or originating extension/phone number of the sender.

Through visual indicator setting mode 116, the user can customize the visual indicators on page 19, i.e., LEDs 23, through the decision tree 100. While LEDs 23a, 23b, and 23c are typically preset to respectively indicate to the user the arrival of voice mail, E-mail and facsimile messages, such a designation need not be necessary. The user may customize any LED 23 to indicate: the arrival of any type of message (e.g., voice mail, E-mail and facsimile), the arrival of a message from a specific person, extension, or place of origination, or the arrival of a page or a specific type of page (e.g.., urgent or confidential).

Illustrating this example, the user is expecting an important facsimile message from the Vice President of the Marketing Division the user can enter visual indicator mode 116 and define (or redefine) LED 23d for "FAX VP". Paging server 13 will send a signal to illuminate LED 23d when a facsimile tagged with the Vice President's extension or code is received. He no longer needs to continually check his messages. With the capabilities of communication system 1 and his new paging device, all he has to do is check and see when the LED 23d is lit.

Paging location mode 118 permits the page to be sent to the user's pager 19 regardless of her location. Paging location mode 118 has two settings: "HOME" and "ROAM". The "HOME" setting is the default setting which should be used when the user is within the paging distance of paging server 13, i.e., the home paging server. The "ROAM" setting is used when the user is outside the paging distance of home paging server 13 and is travelling to a locale within paging distance of a remote paging server, not shown, which is coupled to PBX 3. Further, the "ROAM" setting is programmable to include the extension of the remote paging server. To program the setting to the remote paging server, the user may either enter the extension number of the remote paging server or enter a code, e.g., a city, state or country code, which paging server 13 recognizes as the appropriate extension for that paging server.

In operation, the user can program paging location mode 118 to the "ROAM" setting and enter the extension to the necessary remote paging server. Pages and message notifications are not transmitted directly by paging server 13. Paging server 13 forwards the paging or notification signal to the remote paging server via PBX 3. Remote paging server will receive the signal and transmit the signal to the user in the remote locale. As global PBX environments exists, e.g., CORNET-T, the signal between the paging servers should be clearer and less expensive to transmit.

An advantage provided by the ROAM setting is that callers can page the user anywhere in the world without knowing where the user is located, assuming that the user is within the range of one paging server in the PBX environment.

In addition to the four previously described modes 112, 11.4, 116, and 118 in decision tree 100, a transfer mode, not shown, can be provided. In the transfer mode the user could control the switching software to determine which caller, if any, and under what conditions, his calls will automatically transfer from his extension to paging server 13. For example, the user could select settings of "TRANSFER ALL", "TRANSFER NONE", "TRANSFER IF BUSY", "TRANSFER NO ANSWER", "TRANSFER PRIORITY", and "TRANSFER GROUP". The "TRANSFER ALL" and "TRANSFER NONE" settings respectively transfer all or none of the calls from the user's extension to paging server 13. The "TRANSFER IF BUSY" and "TRANSFER NO ANSWER" settings respectively transfer calls from the user's extension to paging server 13 only is the user's extension is busy or if there is no answer at the user's extension. The "TRANSFER PRIORITY" and "TRANSFER GROUP" settings respectively transfer calls from the user's extension to paging server 13 if the caller's extension or phone number is on a customizable priority list or if the caller's extension or phone number is on a customizable group list and the group is selected for transfer.

The settings in each mode 112, 114, 116, and 118 may be defined and redefined by the user over the telephone by name recognition software or by any of other selection technique. Further, the settings may be programmed to change at given times. For example, if a user had an important meeting on Thursday from 2:00 to 4:00, the user could set the page/store mode 114 to "PAGE ALL" until 2:00 on Thursday and for the period following 4:00 on Thursday, while during the meeting the page/store mode 114 could be set to "PAGE PRIORITY" where she could only be paged by people on her priority list. Similar type setting modifications can be made to the settings in greeting menu tree mode 112, visual indicator mode 116, and paging location mode 118.

To exemplify the capabilities of the invention, a few scenarios are described below which highlight the advantages afforded by the communication system of the present invention.

In a first situation, a user is waiting to receive an important E-mail message. Present devices require the user to wait near his computer, repeatedly check his computer, or have another repeatedly check his computer. According to the present invention, E-mail server 11 sends a notification signal to the paging server 13 upon the receipt of an E-mail message to the user's E-Mail address. The notification signal includes a portion identifying the person who received the E-mail message (i.e., the user) and may optionally include information relating to the identification of the sender and the subject matter of the E-mail message. Paging server 13 receives the notification signal and determines the correct user to notify from the identification code portion of the signal. In response to receiving this signal, paging server 13 transmits a signal to end user paging device 19 of the designated user to illuminate LED 23b which corresponds to the receipt of an E-mail message. Further, if desired, paging server 13 may transmit information relating to the identification of the sender and/or the subject matter of the E-mail message for display on LCD 25 of end user paging device 19. The user carrying his paging device 19 is then notified of the E-mail message receipt and of the sender and subject matter of the E-mail message, regardless of whether he is near his desk or otherwise indisposed (e.g., in a car, at a meeting, at lunch, etc.).

In another situation, a user is waiting to receive an important facsimile message. Present devices require the user to repeatedly check her facsimile machine, or have another repeatedly check her facsimile :machine. According to the present invention, FAX server 9 sends a notification signal to the paging server 13 upon the receipt of a facsimile message. The notification signal includes a portion identifying the person who received the facsimile message (i.e., the user). Paging server 13 receives the notification signal and determines the correct user to notify from the identification code portion of the signal. In response to receiving this signal, paging server 13 transmits a signal to end user paging device 19 of the: designated user to illuminate LED 23c which corresponds to the receipt of a facsimile message.

If the facsimile message originated from a telephone within the PBX network, the notification signal may optionally include information relating to the: identification of the sender or the sending machine. Paging server 13 would then transmit information relating to the identification of the sender or the sending machine for display on LCD 25 of end user paging device 19. The user carrying his paging device 19 is then notified of the facsimile message receipt and of the sender or sending machine of the facsimile message, regardless of whether she is near her facsimile machine or otherwise indisposed.

In yet another situation, the user will be away from her office for the day. However, she would like each caller of her extension to have the option of paging her. She merely transfers her call from her phone to her paging server number. All callers of her extension will be transferred to the paging server and greeted by her message and list of operating functions.

While the preferred pager 19 is shown in FIG. 2, pager 19 could include an audible generating device, i.e., a speaker, and/or a vibration device. These features would notify the user audibly or tactilely which could be used in addition to, or in lieu of, one or more LEDs. Further, an audible generating device could be used which generates a plurality of difference tones or sound patterns to permit additional discriminating criteria for paging and notifying.

Additionally, while the preferred embodiment of this invention incorporates a PBX environment, it is also possible to use this invention with a cellular switching network, a central office switching network, or in another switching environment.

While particular embodiments of the invention have been shown and described, it is recognized that various modifications thereof will occur to those skilled in the art. Therefore, the scope of the herein-described invention shall be limited solely by the claims appended hereto.

What is claimed is:

1. A communication system comprising:

a private branch exchange for connecting internal telephone exchanges, an outside telephone network, a plurality of application servers and a paging system;

said paging system including:
   a paging server, and
   an end user paging device;

said plurality of application servers including a first application server of a first type and a second application server of a second type;

said first and second application servers and said paging server being operatively coupled via said private branch exchange, enabling the receipt of messages by said first and second application servers to be indicated to a user of said end user paging device;

said end user paging device including first and second visual indicating means, wherein the receipt of a message by said first application server actuates said first visual indicating means and said receipt of a message by said second application server actuates said second visual indicating means, said first and second visual indicating means provide visual signals distinguishable from one another, wherein a received message by said first application server will illuminate a first visual signal and a received message by said second application server will illuminate a second visual signal such that the receipt of a message by the first application server is distinguishable from the receipt of a message by the second application server by the user; and said end user paging device further includes a visual display providing visual signals separate from the first and second visual signals for displaying information relating to the origination of a message received by one of said first or second application servers or an alternate source.

2. The communication system of claim 1, wherein said first application server is a facsimile server.

3. The communication system of claim 1, wherein said first application server is a phone mail system.

4. The communication system of claim 1, wherein said first application server is an electronic mail system.

5. The communication system of claim 1, wherein said first and second visual indicating means are illumination members distinct from one another, wherein a received message by said first application server will illuminate the first illumination member and a received message by said second application server will illuminate the second illumination member.

6. The communication system of claim 3, wherein said paging system further including a voice response unit for providing a caller with the option to page the user or leave a voice mail message for the user via said phone mail system.

7. The communication system of claim 3, wherein said paging system further including a voice response unit for providing a caller with a plurality of options for providing characteristics of the page for display by said end user paging device.

8. The communication system of claim 1, wherein said paging server can be programmed to send a signal to another paging server coupled to the private branch exchange so that said another paging server sends a page to the end user paging device.

9. The communication system of claim 1, wherein said paging system is modifiable by each user enabling each user to define valid paging numbers, wherein pages sent by callers with valid paging numbers are transmitted to the end user paging devices and pages sent by callers with invalid paging numbers are stored for later retrieval.

10. The communication system of claim 1, wherein said paging server includes:

a user modifiable function defining means for defining an audible greeting to caller and for defining a list of options for presenting to a caller;

a user modifiable paging determining means for determining whether to send a page to the user or to store the page for later retrieval;

a user modifiable indicator setting means for permitting the user to assign specific indicators on the pager to certain notification for distinguishing therebetween; and a user modifiable paging location means for permitting the user to select the paging server which will transmit the page to his pager.

11. A method for providing message and notification services to a user in a communication system having a private branch exchange for connecting internal telephone exchanges, an outside telephone network, a plurality of application servers including a first application server of a first type and a second application server of a second type, and a paging system including a paging server and an end user paging device, said method comprising:

sending a first message to the first application server;

connecting the first application server and the paging server permitting communication therebetween;

transmitting a first signal from the first application server to the paging server in response to the receipt of the first message by the first application server;

receiving said transmitted first signal by the paging server;

generating a second signal by the paging server in accordance with the received first signal;

transmitting said second signal by the paging server;

receiving said second signal by the end user paging device;

visually indicating the receipt of the second signal on the end user paging device by providing a first illumination signal;

sending a message to the second application server;

connecting the second application server and the paging server permitting communication therebetween;

transmitting a third signal from the second application server to the paging server in response to the receipt of the second message by the second application server;

receiving said transmitted third signal by the paging server;

generating a fourth signal by the paging server in accordance with the received third signal;

transmitting said fourth signal by the paging server;

receiving said fourth signal by the end user paging device; and visually indicating the receipt of the fourth signal on the end user paging device by providing a second illumination signal, the second illumination signal being distinguishable from the first illumination signal.

12. The method of claim 11, wherein one of said sending steps includes sending an E-mail message.

13. The method of claim 11, wherein one of said sending steps includes sending a facsimile message.

14. The method of claim 11 further comprising the steps of providing a voice mail server, and a paging system including a paging server and an end user paging device;

dialing a user's telephone number by a caller;

automatically transferring the call to the paging server;

audibly providing the caller with a list of operations by a voice response unit;

receiving an option choice by the caller;

transmitting a signal to the end user paging device; and displaying data on the end user paging device corresponding to received option choice.

15. The method of claim 14, wherein said option choice and displayed data include a page urgency designation.

16. The method of claim 14, wherein said option choice and displayed data include a page identification designation.

17. The method of claim 14, further comprising:

transferring the caller from the paging server to the voice mail server, and recording an audible message from the caller.

18. A communication system comprising:

a plurality of telephone exchanges;

a plurality of application servers, said plurality of application server including a first application server of a first type and a second application server of a second type;

a paging system including a paging server and an end user paging device; and switching means for connecting a plurality of telephone exchanges, at least one application server and a paging system;

said first and second application servers and said paging server being operatively coupled via said switching means, enabling the receipt of messages by said first and second application servers to be indicated to a user of said end user paging device;

said end user paging device including first and second visual indicating means, wherein the receipt of a message by said first application server actuates said first visual indicating means and said receipt of a message by said second application server actuates said second visual indicating means, said first and second visual indicating means provide visual signals distinguishable from one another, wherein a received message by said first application server will illuminate a first visual signal and a received message by said second application server will illuminate a second visual signal such that the receipt of a message by the first application server is distinguishable from the receipt of a message by the second application server by the user; and said end user paging device further including a visual display providing visual signals separate from the first and second visual signals for displaying information relating to the origination of a message received by one of said first or second application servers or an alternate source.

* * * * *